United States Patent
Piechowicz et al.

(10) Patent No.: US 10,698,954 B2
(45) Date of Patent: *Jun. 30, 2020

(54) COMPUTATION PLATFORM AGNOSTIC DATA CLASSIFICATION WORKFLOWS

(71) Applicant: Facebook, Inc., Menlo Park, CA (US)

(72) Inventors: Szymon Piechowicz, San Mareo, CA (US); Barak Reuven Naveh, Palo Alto, CA (US); Annie Hsin-Wen Liu, Fremont, CA (US); Ashish Gupta, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 762 days.

This patent is subject to a terminal disclaimer.

(21) Appl. No.: 15/199,351

(22) Filed: Jun. 30, 2016

(65) Prior Publication Data
US 2018/0004859 A1    Jan. 4, 2018

(51) Int. Cl.
*G06F 16/901* (2019.01)

(52) U.S. Cl.
CPC .................. *G06F 16/9024* (2019.01)

(58) Field of Classification Search
CPC .................................... G06F 16/9024
USPC .......................................... 707/798
See application file for complete search history.

(56) References Cited

U.S. PATENT DOCUMENTS

| | | | | |
|---|---|---|---|---|
| 7,451,432 B2* | 11/2008 | Shukla | ............... | G06F 8/36 717/106 |
| 8,583,769 B1* | 11/2013 | Peters | ............... | G06F 9/541 709/221 |
| 8,918,387 B1* | 12/2014 | Sokolov | ............... | G06F 21/57 707/707 |
| 9,135,559 B1 | 9/2015 | Szeto et al. | | |
| 9,672,497 B1* | 6/2017 | Lewis | ............... | G06F 17/277 |
| 2004/0215829 A1* | 10/2004 | Hubbard | ............... | G06F 9/5027 709/246 |
| 2006/0271528 A1* | 11/2006 | Gorelik | ............... | G06F 16/24544 |
| 2007/0220294 A1* | 9/2007 | Lippett | ............... | G06F 1/3203 713/320 |

(Continued)

OTHER PUBLICATIONS

U.S. Appl. No. 14/799,517 by Gao, T., et al., filed Jul. 14, 2015.

(Continued)

*Primary Examiner* — James Trujillo
*Assistant Examiner* — Jessica N Le
(74) *Attorney, Agent, or Firm* — Artegis Law Group, LLP

(57) ABSTRACT

Various embodiments include a classification platform system. A user can define a classification experiment on the classification platform system. For example, the user can define an input data space by selecting at least one of data sources interfaced with the classification platform system and defining a workflow configuration including a directed graph (DG) connecting a plurality of transformation blocks to represent an experiment workflow. The DG can specify how one or more outputs of each of the transformation blocks are fed into one or more other transformation blocks. The DG can be executed by various types of computation platforms. The classification platform system can schedule the experiment workflow to be executed on a distributed computation platform according to the input data space and the workflow configuration.

21 Claims, 7 Drawing Sheets

(56) References Cited

U.S. PATENT DOCUMENTS

| | | | |
|---|---|---|---|
| 2007/0294670 A1* | 12/2007 | Hisaki | G06F 8/10 717/120 |
| 2008/0059512 A1* | 3/2008 | Roitblat | G06F 16/35 |
| 2009/0122706 A1* | 5/2009 | Alfano | H04L 41/046 370/237 |
| 2009/0265290 A1 | 10/2009 | Ciaramita et al. | |
| 2010/0070448 A1* | 3/2010 | Omoigui | H01L 27/1463 706/47 |
| 2010/0179855 A1 | 7/2010 | Chen et al. | |
| 2011/0047525 A1* | 2/2011 | Castellanos | G06F 9/4494 717/104 |
| 2012/0054040 A1 | 3/2012 | Bagherjeiran et al. | |
| 2013/0013539 A1* | 1/2013 | Chenthamarakshan | G06N 20/00 706/12 |
| 2013/0191372 A1 | 7/2013 | Lee et al. | |
| 2014/0108308 A1 | 4/2014 | Stout | |
| 2014/0337096 A1 | 11/2014 | Gilad-Bachrach Ran et al. | |
| 2015/0106311 A1 | 4/2015 | Birdwell et al. | |
| 2015/0278241 A1* | 10/2015 | Bates-Haus | G06F 16/215 707/692 |
| 2015/0379426 A1 | 12/2015 | Dirac et al. | |
| 2016/0098662 A1* | 4/2016 | Voss | G06Q 10/06316 705/7.26 |
| 2016/0155069 A1* | 6/2016 | Hoover | G06Q 30/06 706/12 |
| 2016/0171198 A1* | 6/2016 | John Archibald | G06F 21/32 726/19 |
| 2016/0300156 A1 | 10/2016 | Bowers et al. | |
| 2016/0358101 A1 | 12/2016 | Bowers et al. | |
| 2016/0358102 A1 | 12/2016 | Bowers et al. | |
| 2016/0358103 A1 | 12/2016 | Bowers et al. | |
| 2017/0017886 A1 | 1/2017 | Gao et al. | |
| 2017/0076198 A1 | 3/2017 | Bowers et al. | |
| 2017/0083368 A1* | 3/2017 | Bishop | G06F 9/505 |
| 2017/0124486 A1 | 5/2017 | Chan et al. | |
| 2017/0124487 A1 | 5/2017 | Szeto et al. | |
| 2017/0220382 A1* | 8/2017 | Raj | H04L 67/1008 |
| 2017/0262654 A1* | 9/2017 | Wouhaybi | G06F 21/6254 |
| 2017/0364570 A1* | 12/2017 | Jacob | G06N 5/04 |
| 2018/0004835 A1 | 1/2018 | Piechowicz et al. | |
| 2018/0007145 A1 | 1/2018 | Piechowicz et al. | |
| 2018/0285476 A1* | 10/2018 | Siciliano | G06F 8/34 |

OTHER PUBLICATIONS

U.S. Appl. No. 14/851,336 by Jin, O., et al., filed Sep. 11, 2015.

Niu, F. et al., "Hogwild!: A Loc-free Approach to Parallelizing Stochastic Gradient Descent", Computer Sciences Department, University of Wisconsin-Madison, Jun. 2011, pp. 1-22.

Leroux et al. A Genetic Programming Problem Definition Langauge Code Generator for the EpochX Framework, Proceedings of the Companion Publication of the 2014 Annual Conference on Genetic and Evolutionary Computation, 2014, pp. 1149-1154.

Non-Final Office Action dated Nov. 30, 2017 for U.S. Appl. No. 14/799,517 by Gao, T., et al., filed Jul. 14, 2015.

Non-Final Office Action dated Oct. 13, 2017 for U.S. Appl. No. 14/684,041 by Bowers, S., et al., filed Apr. 10, 2015.

Non-Final Office Action dated Oct. 4, 2017 for U.S. Appl. No. 14/732,501 for Bowers, S., filed Jun. 5, 2016.

Non-Final Office Action dated Sep. 25, 2017 for U.S. Appl. No. 14/732,513 for Bowers, S., filed Jun. 5, 2016.

Demšar, Janez, et al. "Orange: data mining toolbox in Python." The Journal of Machine Learning Research 14.1 (2013): 2349-2353.

Microsoft Azure, "Machine Learning: Powerful cloud-based predictive analytics." [website], [retrieved on Aug. 13, 2015]. Retrieved from the internet: http://azure.microsoft.com/en-us/services/machine-learning/, 2014, 6 Pages.

RapidMiner Studio Manual, 2014, [online], [retrieved on Aug. 14, 2015]. Retrieved from: <http://docs.rapidminer.com/downloads/RapidMiner-v6-user-manual.pdf>, 116 pages.

U.S. Appl. No. 14/684,041 by Bowers, S., et al., filed Apr. 10, 2015.
U.S. Appl. No. 14/732,501 by Bowers, S., et al., filed Jun. 5, 2015.
U.S. Appl. No. 14/732,509 by Bowers, S., et al., filed Jun. 5, 2015.
U.S. Appl. No. 14/732,513 by Bowers, S., et al., filed Jun. 5, 2015.
U.S. Appl. No. 15/199,335 by Piechowicz, S., et al., filed Jun. 30, 2016.
U.S. Appl. No. 15/199,403 by Piechowicz, S., et al., filed Jun. 30, 2016.

* cited by examiner

700

```
┌─────────────────────────────────────────────────────────────────┐
│  select, from a plurality of different computation platforms, a distributed  │
│  computation platform to execute at least part of a classification experiment │
│                              702                                 │
└─────────────────────────────────────────────────────────────────┘
                                  │
┌─────────────────────────────────────────────────────────────────┐
│ schedule the selected distributed computation platform to execute at least part │
│        of the classification experiment according to an input data space and a  │
│  workflow configuration (e.g., represented by a directed graph of transformation │
│                   blocks) of the classification experiment                       │
│                              704                                 │
└─────────────────────────────────────────────────────────────────┘
                                  │
┌─────────────────────────────────────────────────────────────────┐
│    prevent a transformation block in the DG from being executed by the           │
│  distributed computation platform if the transformation block as defined by the  │
│    workflow configuration matches an entry in a memoization database             │
│                              706                                 │
└─────────────────────────────────────────────────────────────────┘
                                  │
┌─────────────────────────────────────────────────────────────────┐
│      pipe an output result of executing the classification experiment to an      │
│                            application service                                   │
│                              708                                 │
└─────────────────────────────────────────────────────────────────┘
```

*FIG. 7*

COMPUTATION PLATFORM AGNOSTIC DATA CLASSIFICATION WORKFLOWS

CROSS-REFERENCE

This application relates to U.S. patent application Ser. No. 15/199,335, entitled "GRAPHICALLY MANAGING DATA CLASSIFICATION WORKFLOWS IN A SOCIAL NETWORKING SYSTEM WITH DIRECTED GRAPHS," filed on Jun. 30, 2016 and U.S. patent application Ser. No. 15/199,403, entitled "DATA CLASSIFICATION WORKFLOWS IMPLEMENTED WITH DYNAMICALLY MODIFIABLE DIRECTED GRAPHS", filed Jun. 30, 2016, all of which are incorporated herein by reference in their entirety.

BACKGROUND

Data classifiers are popular tools for analyzing data produced or otherwise collected by large computer networks. Data classification enables a computer network to analyze and react to a large and evolving data set. Data classifiers can process large data sets (e.g., sometimes referred to as "big data") that are so large and/or complex that manual data analysis is impracticable. For example, a social networking system can run several application services that continuously produce and collect data. Classifiers can be used to identify new correlations, statistics, trends, patterns, or any combination thereof in datasets of the social networking system. For example, data classification can rely on static rules or evolving machine learning models. To complete a data classification experiment involving machine learning models, a computer system may need to extract and transform input data, train and update machine learning models, deliberate and execute machine learning models, compile and/summarize the classification results, test or evaluate the classification results, or any combination thereof. These actions often consume a large amount of computational resources (e.g., memory capacity, processor capacity, and/or network bandwidth) and require data scientists' or developers' involvement to repeatedly configure each operational step from one data classification experiment to another.

BRIEF DESCRIPTION OF THE DRAWINGS

FIG. 7 is a flow chart illustrating a method of operating a classification platform system to execute a classification experiment, in accordance with various embodiments.

Figure 1:
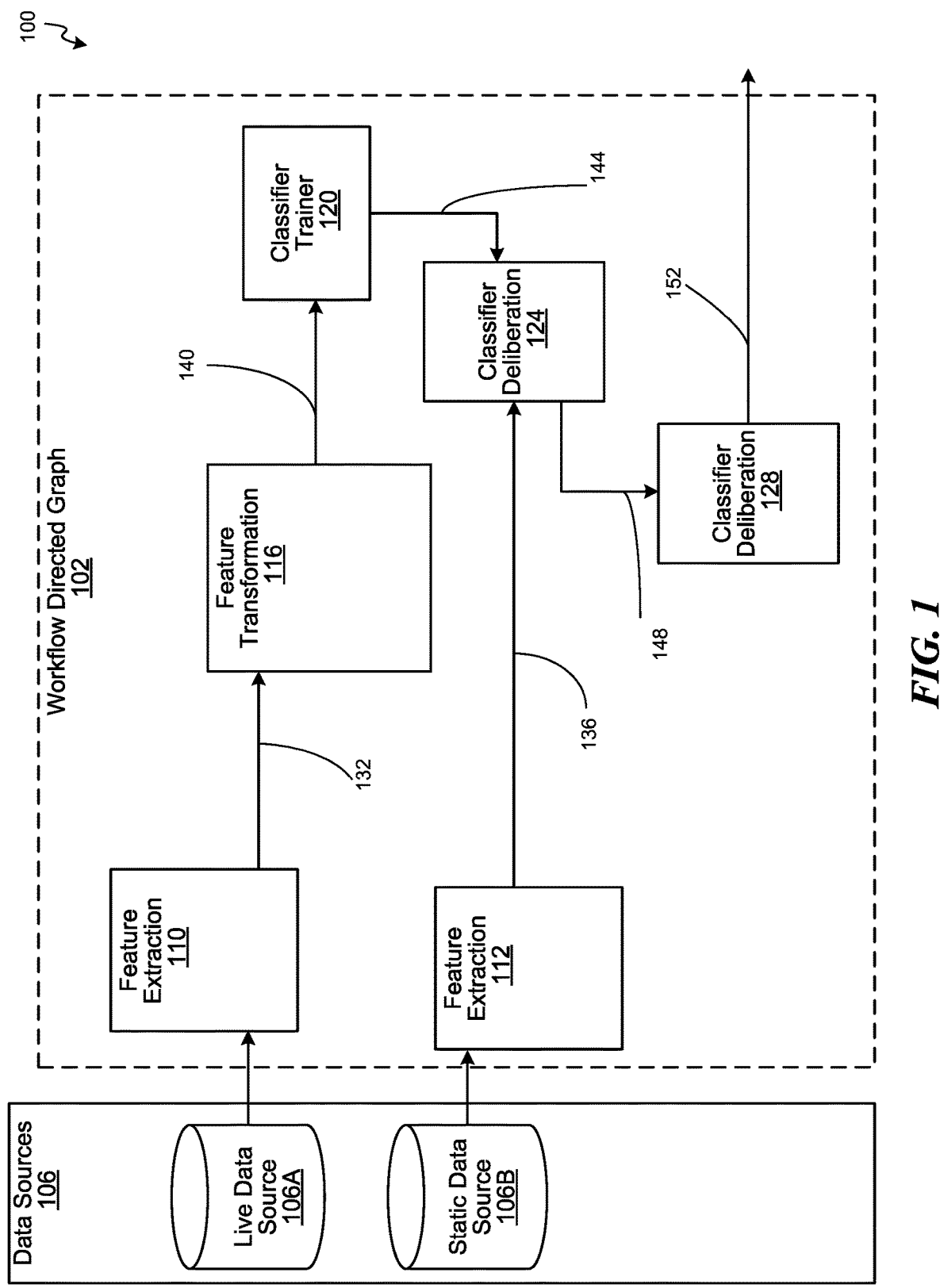
FIG. 1 is a data flow diagram illustrating an example of a classification experiment running on a computer system, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Various embodiments are directed to a classification platform system to facilitate definition of a classification experiment by defining a classification experiment by at least defining a directed graph (DG). For example, the classification platform system can provide a graphical user interface to graphically place, connect, and arrange transformation blocks within a DG. In some embodiments, the DG can be a directed acyclical graph (DAG). A transformation block can be a data processing operator that defines the computation logic and executable instructions to transform input data into some sort of output data.

In one example, the classification platform system can be implemented in a social networking system. A classification experiment can pertain to the entire or a subset of the process of analyzing data sets (e.g., heterogeneous data sets) to place them in categories. A classification experiment can include a DG-represented workflow comprising one or more repeatable functions of feature extraction, data transformation, data labeling, machine learning model training, classifier deliberation (e.g., utilizing a classifier model to classify data), classification result summarizations, classification result evaluations, or any combination thereof. Portions or the whole of a DG-represented workflow can be repeatedly used by the classification platform system using different input data without manual reconfiguration (e.g., by a developer account or a data scientist account).

Classification experiments can include, for example, content category classifiers, event classifiers, quality detection classifiers (e.g., junk/spam filters), content deduplication classifiers, or any combination thereof. The classification platform system can be coupled to various data sources (e.g., static or live sources) from which a classification experiment can source its data in each run of the classification experiment. The classification platform system can implement an experiment definition user interface accessible via a Web server or an application coupled to an application programming interface (API).

The classification platform system can receive configuration parameters of a classification experiment via the experiment definition user interface. The configuration parameters can define, for a classification experiment, a prediction space (e.g., which data sources to use and what features to extract to make classification predictions), a labeled data space (e.g., where to find pre-classified labeled data for classifier training and evaluation), a workflow configuration (e.g., parameters describing one or more DGs representing an experiment workflow), a domain configuration (e.g., parameters binding the prediction space, the label data source, and the workflow configuration together), or any combination thereof. The classification platform system can utilize the labeled data space with supervised or semi-supervised machine learning algorithms. The workflow configuration can be defined as a DG connecting transformation blocks (e.g., feature extractors, classifier trainers, classifier predictors, filters, data transformers, statistical functions, other logical transformation functions, or any combination thereof). A classifier predictor can be a data classification algorithm configured by a trained classifier model. A DG can be defined at least partially by incorporating one or more other existing DGs stored in the classification platform system. The DG can specify how one or more outputs of a transformation block are fed into one or more transformation blocks. The DG and the domain configuration can further bind input data from the prediction space and/or labeled data space to at least one of the transformation blocks. In some implementations, a transformation block can dynamically modify the DG during execution. In some embodiments, the DG can be graphically edited and created on a graphical user interface of the classification platform system.

The classification platform system reduces cycle time and avoiding unnecessary computation by memoization of the other transformation blocks. During execution of numerous data transformation workflows within a single day, there can be simultaneously and/or consecutively executing workflows. These workflows can avoid re-computation by matching configurations of their transformation blocks against a memoization database to extract pre-computed results.

One or more inputs of a transformation block are not always directly from the prediction space and/or the labeled data space. For example, an output of a transformation block can be an input of another transformation block. In one example, an output of a data classifier can be an input of another data classifier. A compiler system on the classification platform system can inspect a DG representation and output a data structure representing an execution schedule. One such data structure can include one or more pipelines for training one or more of classifier models, making classification predictions, and/or transforming data into other intermediate representations that can be used in one or more online services of a social networking system. The data structure can be interpretable by different distributed computation platforms. Each computation platform can be configured to execute at least part of the DG representing an experiment workflow under a different paradigm (e.g., data parallelism, task parallelism, declarative programming execution, imperative programming execution, or any combination thereof).

The classification platform system can modularize building and usage of classifiers to be used across classification experiments. The classification platform system can also remove the dependency of classification workflows from the computation platforms that execute them. The classification platform system can template transformation blocks to facilitate creation of a classification experiment workflow. The classification platform system can store data features and transformation block outputs to be reused across various classification experiments. The classification platform system can schedule a workflow for updating (e.g., training and/or retraining) of machine learning models and a workflow for making classifications and/or predictions utilizing the trained machine learning models. The classification platform system can productionalize the classification experiments to deliver deliberation results directly to consumer entities (e.g., applications, user accounts, and/or services within a social networking system) of the classification experiments. For example, the consumer entities can include a developer interface, one or more application services, and/or one or more data repositories. The classification platform system can reduce cycle time and computation resources via memoization.

Referring now to the figures, FIG. 1 is a data flow diagram illustrating an example of a classification experiment 100 running on a computer system, in accordance with various embodiments. In some embodiments, the computer system is a social networking system. The classification experiment 100 can be defined by various configuration parameters, including a workflow DG 102. The workflow DG 102 can be represented by one or more transformation blocks directionally connected to one another. A transformation block is a data processing operator. The workflow DG 102 can form a pipeline (e.g., represented by a directed graph) out of a plurality of transformation blocks. The directed graph can be a directed acyclical graph.

A classification platform system of the computer system can facilitate definition of classification experiments, e.g., the classification experiment 100. The classification platform system can be connected to one or more data sources (e.g., a live data source 106A, a static data source 106B, etc., collectively as the "data sources 106"). The classification experiment 100 can source input data from at least a subset of the data sources. For example, the configuration parameters can identify the selected data sources utilized by at least some of the transformation blocks in the workflow DG 102.

In the illustrated example, the workflow DG 102 can include a first feature extraction block 110, a second feature extraction block 112, a feature transformation block 116, a classifier trainer 120, a first classifier deliberation block 124, and a second classifier deliberation block 128. For example, the first feature extraction block 110 can produce a first feature set 132, and the first feature set 132 can be consumed by (e.g., act as an input for) the feature transformation block 116. The second feature extraction block 112 can produce a second feature set 136, and the second feature set 136 can be consumed by the first classifier deliberation block 124. The feature transformation block 116 can produce a transformed feature set 140, and the transformed feature set can be consumed by the classifier trainer 120. The classifier trainer 120 can produce a machine learning model 144, and the machine learning model 144 can be used to configure the first classifier deliberation block 124. The first classifier deliberation block 124 can produce a first classifier result set 148, and the first classifier result set 148 can be consumed by the second classifier deliberation block 128. The second classifier deliberation block 128 can produce a second classifier result set 152, and the second classifier result set 152 can be the final output of the classification experiment 100.

In some embodiments, the first feature extraction block 110 and the second feature extraction block 112 output their respective feature sets by filtering and/or selecting data entries from the data sources 106, according to a set of one or more criteria. In some embodiments, the feature transformation block 116 generates the transformed feature set 140 by reducing, extrapolating, summarizing, normalizing, converting, or any combination thereof, data features provided in the first feature set 132.

In some embodiments, the data sources 106 constitute the inputs to the workflow DG 102 of the classification experiment 100. In some embodiments, the first feature set 132 and the second feature set 136 are pre-generated before the classification experiment 100 begins. For example, the classification platform system can store features generated by a previously ran classification experiment for use by subsequent classification experiments. In these embodiments, the first feature set 132 and the second feature set 136 are the inputs to the workflow DG 102. The computer system can store a representation of the workflow DG 102. The workflow DG 102 is formed as a collection of transformation blocks and directed edges. Each edge can connect one transformation block to another directionally. The workflow DG 102 can be acyclical. The acyclical nature of the workflow DG 102 can ensure that that there is no way to start at a transformation block and follow a sequence of edges that eventually loops back to the same transformation block again. This prevents execution of a workflow that falls into an infinite/indefinite loop.

Figure 2:
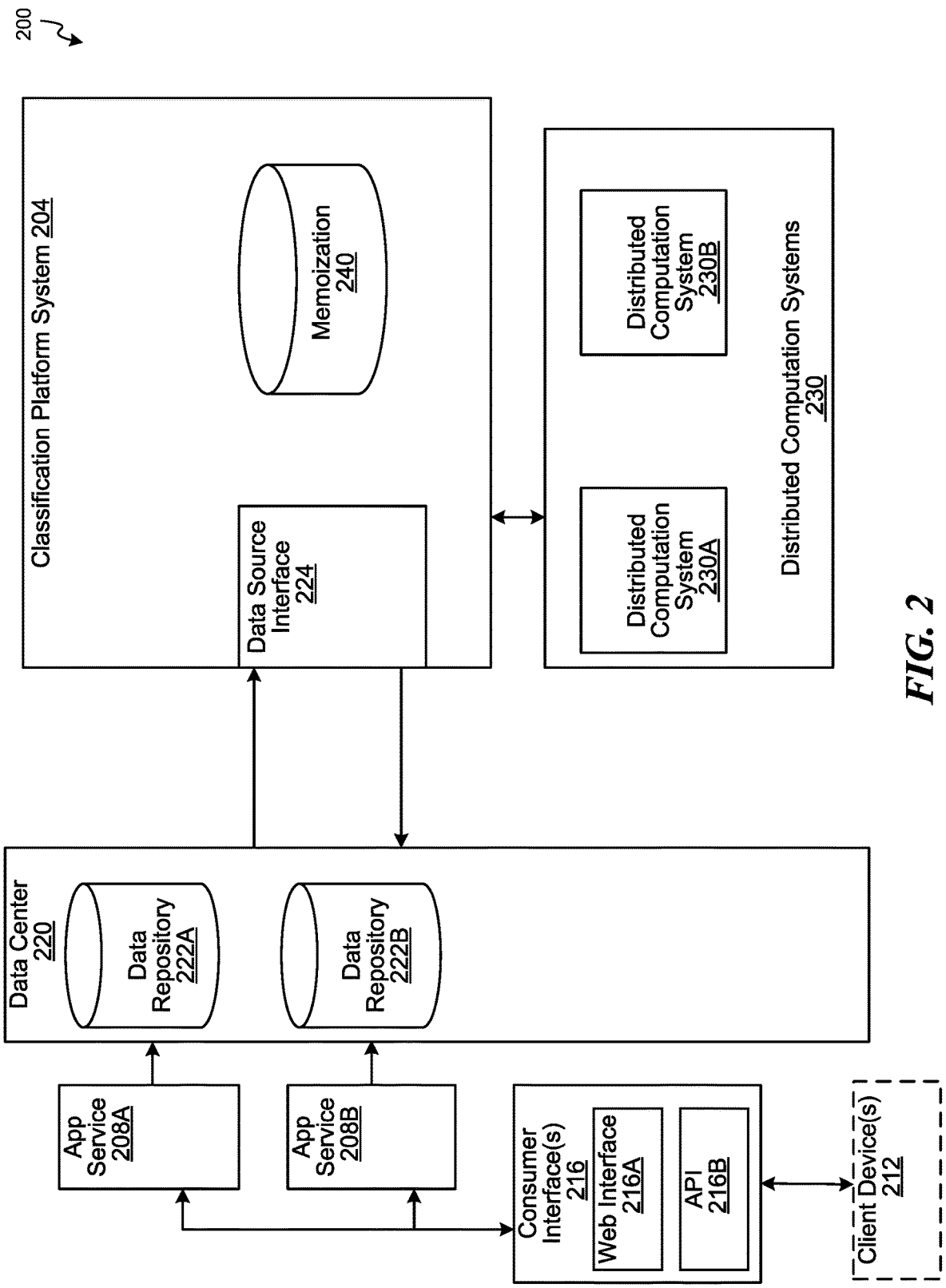
FIG. 2 is a block diagram illustrating an example of a social networking system that incorporates a classification platform system to facilitate classification experiments, in accordance with various embodiments.

FIG. 2 is a block diagram illustrating an example of a social networking system 200 that incorporates a classification platform system 204 to facilitate classification experiments (e.g., the classification experiment 100 of FIG. 1), in accordance with various embodiments. The social networking system 200 can include one or more application services (e.g., an application service 208A and an application service 208B, collectively as the "application services 208"). The application services 208 can generate and/or collect data from one or more client devices 212 via one or more consumer interfaces 216 (e.g., a web interface 216A, an application programming interface (API) 216B, or a combination thereof, collectively as the "consumer interfaces 216").

In some embodiments, the application services 208 can process client interactions (e.g., content request, interaction with social network objects via a user interface of the social networking system 200, user-generated content updates, etc.) in real-time. The client interactions can be considered "live traffic" that are logged in a data center 220 (e.g., including a data repository 222A and a data repository 222B, collectively as the "data repositories 222"). The application services 208, for example, can include a search engine, a photo editing tool, a location-based tool, an advertisement service, a media service, an interactive content service, a messaging service, a social networking service, or any combination thereof.

In one example, the application service 208A is a location logger that stores geographical locations of user accounts of the social networking system 200 in a live location database in the data center 220. Because the location logger continuously updates the live location database, the live location database can be considered a live data source (e.g., the live data source 106A of FIG. 1). In one example, the application service 208B stores static user-generated content in a content database in the data center 220. Because each unique content, once uploaded, remains static, the content database can be considered a static data source (e.g., the static data source 106B of FIG. 1).

The classification platform system 204 can facilitate privileged users (e.g., developer accounts and/or data scientist accounts) of the social networking system 200 to run classification experiments based on social network data collected by the application services 208. The classification platform system 204 can facilitate creation of new experiments on a user interface. Each classification experiment can be repeatedly run with or without modifying its configuration parameters. Each classification experiment can correspond to at least one workflow DG (e.g., the workflow DG 102 of FIG. 1).

The social networking system 200 can include distributed computation systems (e.g., a distributed computation system 230A and a distributed computation system 230B, collectively as the "distributed computation systems 230"). The distributed computation systems 230 can include computation platform of different types as well as similar computation platforms for redundancy. Each of the distributed computation systems 230 can include one or more computing devices (e.g., computer servers). The classification platform system 204 can schedule the classification experiments to be run on one of the distributed computation systems 230. For example, based on the dependencies of transformation blocks indicated in a workflow DG, the classification platform system 204 can determine which of the transformation blocks to schedule on the selected distributed computation system before other transformation blocks of the workflow DG are scheduled. The classification platform system 204 can provide input data or links to the input data of the scheduled transformation blocks to the selected distributed computation system. The outputting results of the executed transformation blocks are stored back into a memoization repository 240 of the classification platform system 204. For example, the final output of the last transformation block (e.g., transformation block that is not attached to an existing edge and does not feed its output result to another transformation block) of a workflow DG is marked as classification results of the classification experiment. In some embodiments, the results of a classification experiment can be fed back to the application services 208 to modify decision-making logic of at least one of the application services 208.

Figure 3:
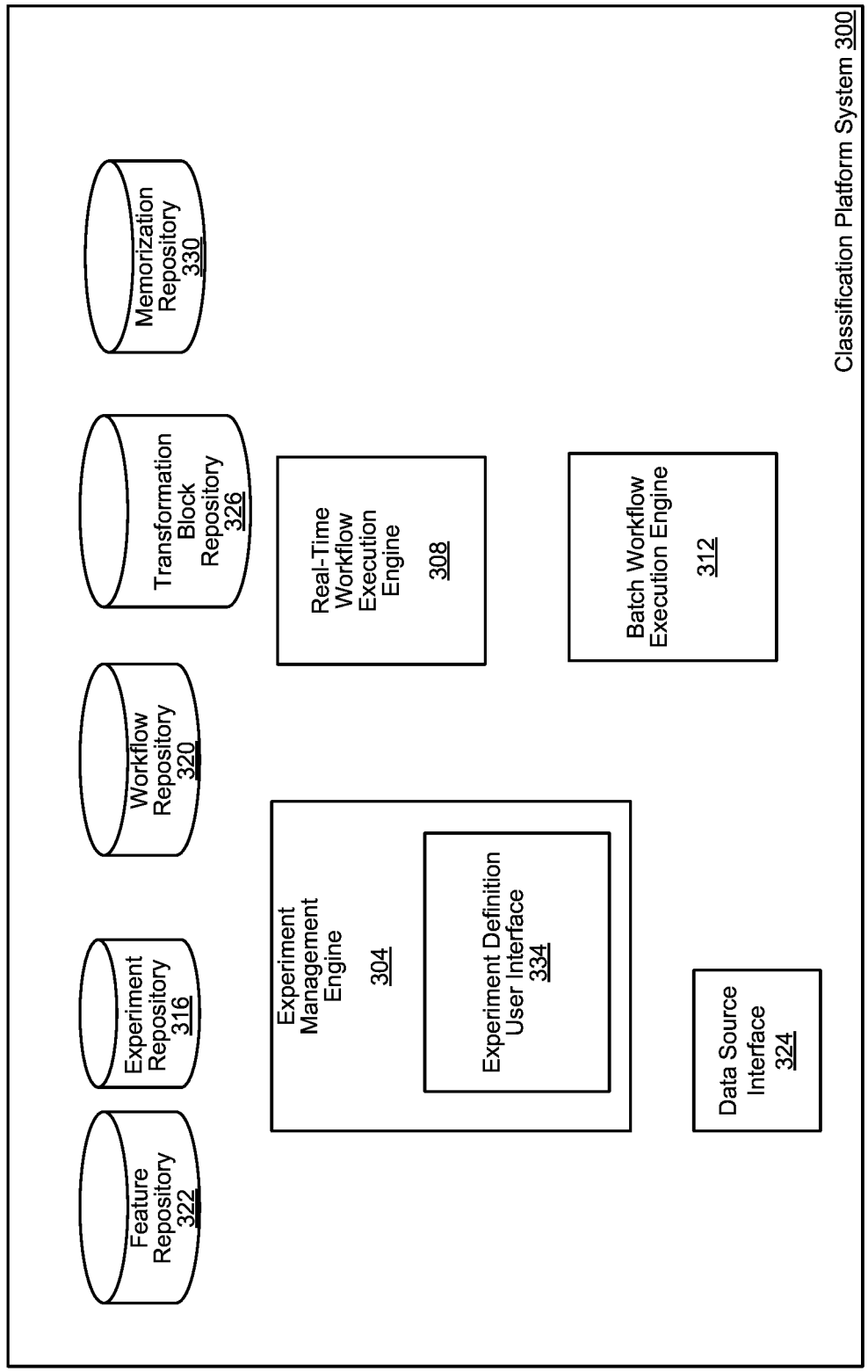
FIG. 3 is a block diagram illustrating a classification platform system that manages classification experiments, in accordance with various embodiments.

FIG. 3 is a block diagram illustrating a classification platform system 300 that manages classification experiments (e.g., the classification experiment 100 of FIG. 1), in accordance with various embodiments. The classification platform system 300 includes an experiment management engine 304, a real-time workflow execution engine 308, a batch workflow execution engine 312, an experiment repository 316, a workflow repository 320, a feature repository 322, a data source interface 324, a transformation block repository 326, a memoization database 330, or any combination thereof.

The experiment management engine 304 facilitates the definition of one or more classification experiments (e.g., the classification experiment 100 of FIG. 1). The experiment management engine 304 can include an experiment definition user interface 334. The experiment definition user interface 334 can be a user interface implemented as a webpage, a website comprising interconnected webpages, an API coupled to a computer application or mobile application, or any combination thereof. The experiment definition user interface 334 can receive configuration parameters from a client device for defining and/or updating a classification experiment. The configuration parameters can be received as text formatted in a markup language or as a series of user interactions with a graphical user interface of the experiment definition user interface 334. For example, a workflow DG of the classification experiment can be defined by visually drawing, placing and arranging block shapes representing the transformation blocks of the workflow DG and directional connections (e.g., arrows) between the block shapes.

The experiment definition user interface 334 can also enable a client device to monitor the scheduling and execution of the classification experiment. In some embodiments, the experiment definition user interface 334 enables the client device to track the classification results of the classification experiment. In some embodiments, the experiment definition user interface 334 further receives instructions to connect the classification results to one or more external application services from a developer account.

In various embodiments, the classification platform system 300 can include a plurality of workflow execution engines implemented to manage one or more distributed computation systems (e.g., the distributed computation systems 230 of FIG. 2). For example, the real-time workflow execution engine 308 can be configured to execute a classification experiment on a distributed computation system by classifying live data in substantially real-time. The batch workflow execution engine 312 can be configured to execute a classification experiment by classifying batches of constant size data sets.

For example, each of the workflow execution engines can facilitate execution of an experiment workflow of a classification experiment. The workflow execution engines can manage and schedule execution of code packages associated with the transformation blocks in the experiment workflow. For example, a workflow execution engine can select computing devices to run specific transformation blocks of the experiment workflow, distribute code packages corresponding to the transformation blocks, distribute references or links to input datasets of the experiment workflow, and/or schedule execution of the code packages on the computing devices. The workflow execution engine can also ensure load-balancing and resource consumption minimization when scheduling the experiment workflow for execution on the selected computing devices (e.g., by managing the selection of the computing devices, distributing appropriate code packages, and/or streaming the input datasets or links thereto ahead of execution schedule while minimizing network bandwidth). The workflow execution engine can schedule execution of the workflow by analysis of the experiment workflow indicated by the workflow configuration (e.g., a DG of transformation blocks) to avoid bottlenecks, errors, and inconsistencies. The workflow execution engine can also schedule the execution of the experiment workflow based on statuses of currently running classification experiments, health data and operation states of the data sources, and/or scheduled execution times of scheduled classification experiments. For example, the workflow execution engine can ensure that a transformation block, which requires the output of another transformation block to execute, is not executed in parallel with that other transformation block.

In various embodiments, the classification platform system 300 includes the experiment repository 316, the workflow repository 320, and the transformation block repository 326 to facilitate definition of classification experiments. The experiment repository 316 stores definitions of previous classification experiments. Any of the classification experiments in the experiment repository 316 can be executed again using different input data. A new classification experiment can also inherit the configuration and definition of a previous classification experiment. The workflow repository 320 stores workflow configurations used in previous classification experiments. For example, the workflow configurations can be represented by a DG comprising transformation blocks connected to one another. A new classification experiment can import one or more DGs and/or workflow configurations from the workflow repository 320.

The transformation block repository 326 stores definitions of transformation blocks. For example, the definition of a transformation block includes logic to transform input data into some sort of output data. When creating a new DG for a workflow configuration of a classification experiment, the experiment management engine 304 can import one or more transformation blocks into the new DG from the transformation block repository 326. For example, the transformation blocks can be defined by at least an input data schema (e.g., one or more input data formats/types), a transformative function (e.g., executable instructions to transform the input data), and an output data schema (e.g., one or more output data format/types).

The data source interface 224 can be an API for the classification platform system 300 to connect with one or more databases storing data features (e.g., input data for classifiers) and/or precursors to data features. The data source interface 224 can also be coupled to one or more application services that generate data features and/or precursors to data features.

In various embodiments, the classification platform system 300 includes the feature repository 322 and the memoization database 330 to reduce wasting of computational resources when executing a classification experiment. The feature repository 322 stores one or more feature data sets that can be identified as the input data for a classification experiment. The memoization database 330 stores one or more outputs of a known transformation block. When executing an experiment workflow of a classification experiment, the real-time workflow execution engine 308 or the batch workflow execution engine 312 can determine whether to schedule for the execution of a transformation block in the experiment workflow. The workflow execution engine can determine whether to schedule for the execution of the transformation block by matching the identity of the transformation block and its input data set against a lookup table of the memoization database 330. This process enables the workflow execution engine to avoid having to execute the same transformation block more than once.

Functional components (e.g., devices, engines, modules, and data repositories, etc.) associated with the social networking system 200 and/or the classification platform system 300 can be implemented as a combination of circuitry, firmware, software, or other executable instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

Figure 4:
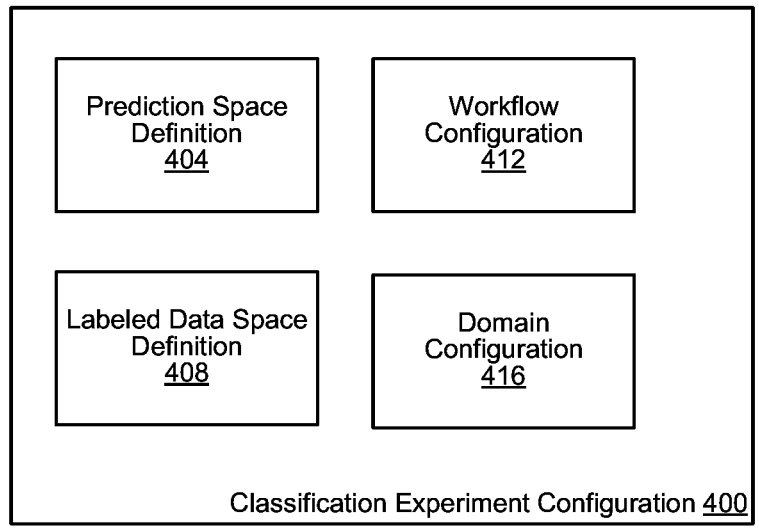
FIG. 4 is a block diagram illustrating an example of a classification experiment configuration, in accordance with various embodiments.

FIG. 4 is a block diagram illustrating an example of a classification experiment configuration 400, in accordance with various embodiments. The classification experiment configuration 400 defines the parameters of a classification experiment. The classification experiment configuration 400 can include a prediction space definition 404, a labeled data space definition 408, a workflow configuration 412, a domain configuration 416, or any combination thereof. The prediction space definition 404 can define data sets or open-ended data streams to run the trained classifier model on. The labeled data space definition 408 can define data sets for classifier training and/or classified evaluation. The workflow configuration 412 defines an experiment workflow of the classification experiment. For example, the workflow configuration 412 can define a DG representative of the experiment workflow. The domain configuration 416 can bind the workflow configuration 412 with the labeled data space definition 408 and/or the prediction space definition 404.

The domain configuration 416 can also enable various classification experiment execution features supported by a classification platform system (e.g., the classification platform system 300 of FIG. 3). For example, the execution features can include a checkpoint feature that prevents regression of a classifier model by evaluating, in real-time, whether a transformation block is malfunctioning, and whether to terminate a scheduled run or an executing run of an experiment workflow. The execution features can also include an active learning feature that actively requests labeling of data entries from a user account (e.g., a user account of the social networking system 200 of FIG. 2). The active learning feature can occur after an experiment workflow has been executed or during the execution of the experiment workflow.

Figure 5:
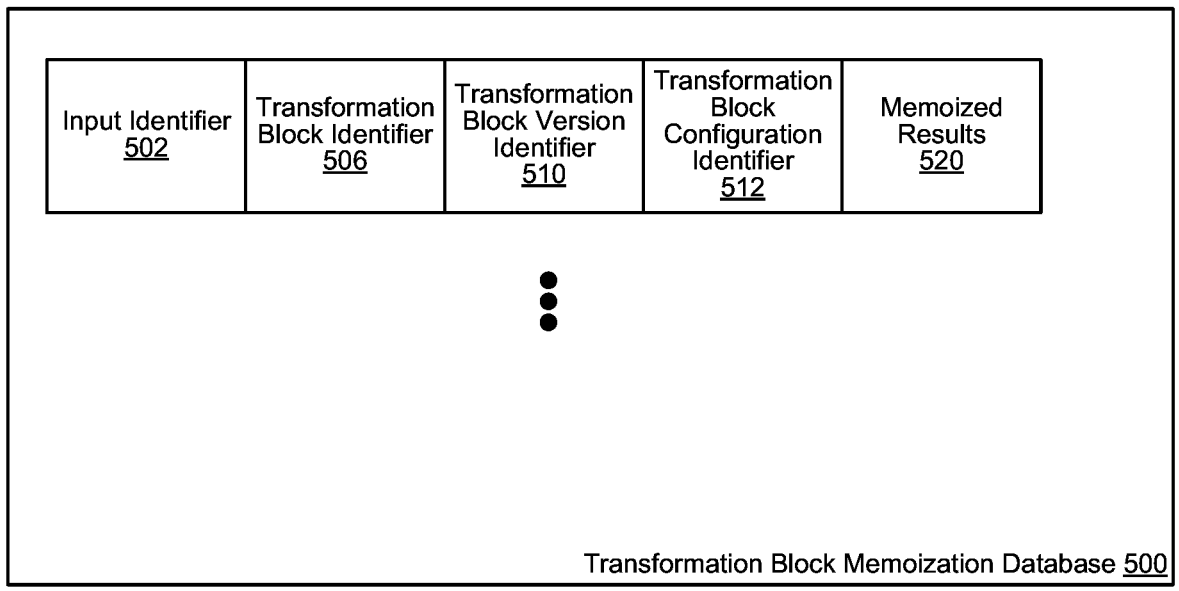
FIG. 5 is a block diagram illustrating an example of a transformation block memoization database, in accordance with various embodiments.

FIG. 5 is a block diagram illustrating an example of a transformation block memoization database 500, in accordance with various embodiments. For example, the transformation block memoization database 500 can be a lookup table. The keys to the lookup table can be an input identifier 502, a transformation block identifier 506, a transformation block version identifier 510, a transformation block configuration identifier 512, or any combination thereof. In the illustrated block diagram, only a single row of the lookup table is shown. However, in various embodiments, the lookup table can include multiple rows.

The potential return values of the lookup table are memoized results 520 of previously executed transformation blocks. A query request to the transformation block memoization database 500 can include one or more keys. The transformation block memoization database 500 can match the requested keys against the known keys to return one of the memoized results 520.

The transformation block identifier 506 can be a unique identification number assigned by a classification platform system (e.g., the classification platform system 300 of FIG. 3). The transformation block version identifier 510 can be a version number. The input identifier 502 can uniquely represent an input data space of the transformation block associated with the transformation block identifier 506. For example, the input identifier 502 can be a hash of features set identifiers. The transformation block configuration identifier 512 can uniquely represent configuration parameters associated with the transformation block when the memoized results 520 were computed. For example, the transformation block configuration identifier 512 can be a hash of the configuration parameter values.

Figure 6:
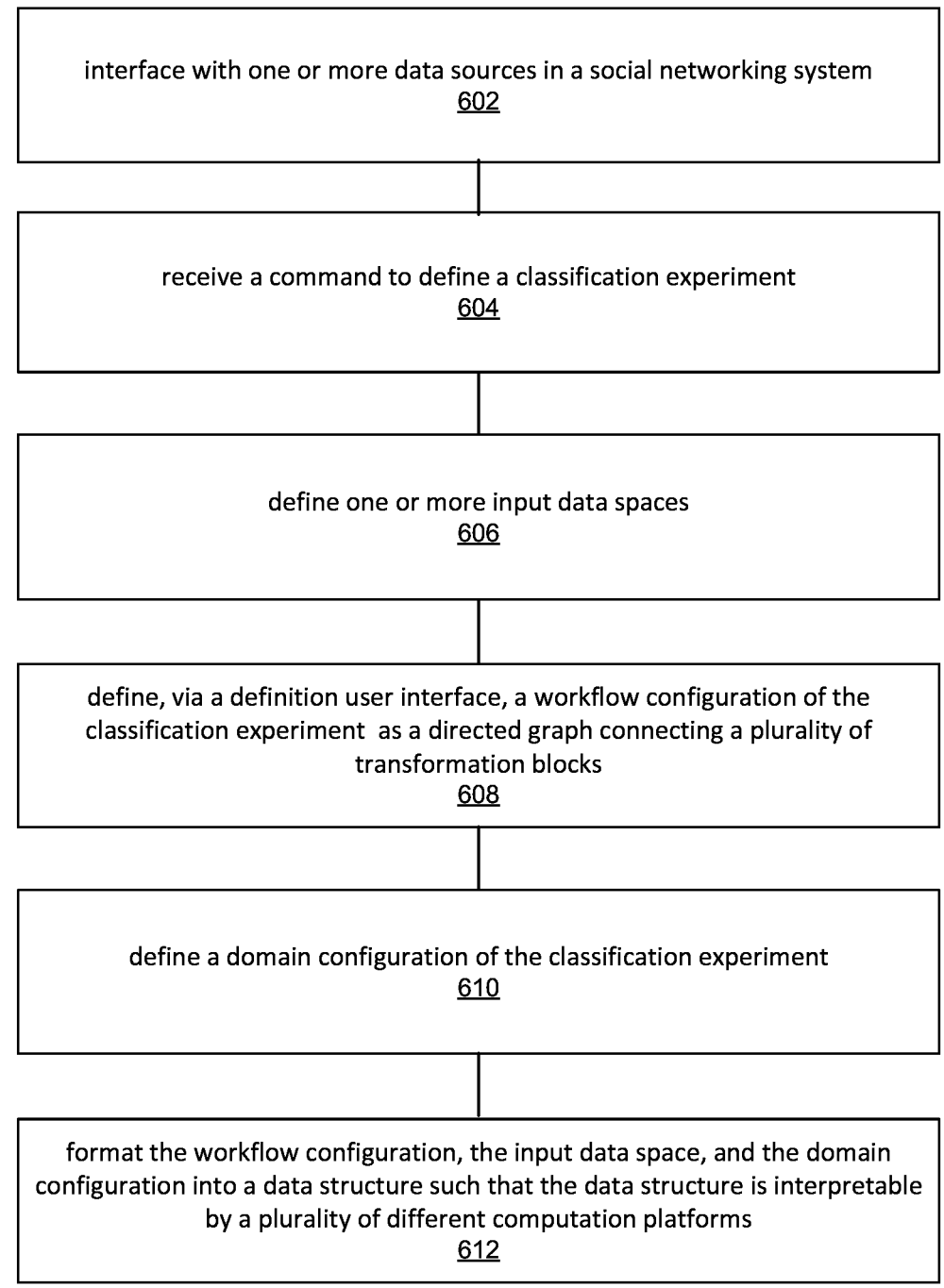
FIG. 6 is a flow chart illustrating a method of operating a classification platform system to create a classification experiment, in accordance with various embodiments.

FIG. 6 is a flow chart illustrating a method 600 of operating a classification platform system (e.g., the classification platform system 300 of FIG. 3) to create a classification experiment, in accordance with various embodiments. In block 602, the classification platform system can interface with one or more data sources in a social networking system. The data sources can be a live data source or a static data source. The data source can also be a feature bank (e.g., the feature repository 322 of FIG. 3) of the classification platform system. The feature bank can cache feature sets generated in a previous classification experiment. These cached feature sets can be reused across multiple subsequent classification experiments In block 604, the classification platform system can receive a command to define a classification experiment (e.g., by creating a new classification experiment or updating a stored classification experiment in an experiment repository (e.g., the experiment repository 316 of FIG. 3). In block 606, the classification platform system can define one or more input data spaces. For example, a user account with access to the classification platform system can select least one of the data sources interfaced with the classification platform system to include in the input data spaces. The input data spaces can include a prediction space and a labeled data space. The selected data source can include a live data source from a social networking system. The live data source can produce an open-ended stream of new data entries formatted according to one or more data formats of the defined input data space. The selected data source can include a static data source from a social networking system. The static data source can include a static data set with a constant data size formatted according to one or more data formats of the defined input data space.

In block 608, the classification platform system can define, via a definition user interface (e.g., the experiment definition user interface 334 of FIG. 3), a workflow configuration of the classification experiment. In some embodiments, the definition user interface can be a graphical user interface. In one example, defining the classification experiment can include inheriting a directed graph for the workflow configuration from a workflow repository (e.g., the workflow repository 320 of FIG. 3).

In another example, the definition user interface can receive commands to graphically arrange a DG connecting a plurality of transformation blocks to represent an experiment workflow of the classification experiment. The graphical arrangement can include placing graphical representations of the transformation blocks and connecting the transformation blocks with one or more arrows or other directional graphical representations. The DG can specify how one or more outputs of each of the transformation blocks are fed into one or more other transformation blocks. Each transformation block can be selected from a transformation block repository (e.g., the transformation blocks repository 326 of FIG. 3).

The input data space, from block 606, can define one or more data sources to feed into at least a subset of the transformation blocks and one or more data fields to extract from the data sources. The input data space can be a labeled data space that includes at least a parameter to locate labeled data for training a supervised classifier machine learning model or for evaluating classification precision or recall of a classifier model. The input data space can be a prediction space that includes at least a parameter to locate input data to be classified in the classification experiment. The input data space can select at least a live data source from the data sources to feed into at least one of the transformation blocks.

The transformation blocks can include a data feature extraction process, data feature filtering process, a data feature transformation process, a classifier deliberation process, a classifier training process, a classifier evaluation process, or any combination thereof. For example, the transformation blocks can include a transformation block representative of a supervised machine learning training process that utilizes a labeled data source defined in the labeled data space for training. The transformation blocks can include a transformation block representative of a classification evaluation process that utilizes a labeled data source defined in the labeled data space to evaluate classification precision or classification recall. The transformation blocks can include a supervised machine learning prediction/deliberation process that utilizes data identified by the prediction space to run against one or more rules or trained machine learning models to produce a classification result.

In some embodiments, a transformation block in the DG includes logic to dynamically modify the DG during execution of the experiment workflow. The transformation block can include logic to dynamically modify input data of an existing transformation block in the DG. The transformation block can include logic to change or remove an existing transformation block in the DG or to add a new transformation block to the DG.

In block 610, the classification platform system can define a domain configuration of the classification experiment. The domain configuration can include at least a parameter binding the input data space and the workflow configuration.

In block 612, the classification platform system can format the workflow configuration, the input data space, and/or the domain configuration into a data structure such that the data structure is interpretable by a plurality of different computation platforms (e.g., computation platforms of different types operating under different programming paradigms). Each of the computation platforms can be capable of executing the classification experiment. The computation platforms can utilize one or more different programming paradigms (e.g., task parallelism, data parallelism, imperative workflow programming, declarative workflow programming) based on the workflow configuration of the classification experiment. For example, the data structure can be formatted to describe the dependency of transformation blocks as extracted from the DG and the input space, and thus enables a task parallel computation platform (e.g., real-time platform) to schedule transformation blocks based on dependency and interdependency of the transformation blocks. In another example, the data structure can be formatted to describe the relative size of input data of the transformation blocks as extracted from the DG and the input space, and thus enables a data parallel computation platform (e.g., batch processing platform) to schedule instances of the transformation blocks to process different elements within a large dataset.

FIG. 7 is a flow chart illustrating a method 700 of operating a classification platform system (e.g., the classification platform system 300 of FIG. 3) to execute a classification experiment, in accordance with various embodiments. In block 702, the classification platform system can select, from a plurality of different computation platforms, a distributed computation platform to execute at least part of the classification experiment. The distributed computation platform can be selected based on a geographical or network location of the distributed computation platform relative to one or more geographical or network locations of input data specified in a defined input data space of the classification experiment. The selected distributed computation platform can be configured to execute the classification experiment in substantially real-time in response to new data from the live data source. The selected distributed computation platform can be configured to execute the classification experiment in batch (e.g., via recurring batch processing).

In block 704, the classification platform system can schedule the selected distributed computation platform to execute at least part of the classification experiment according to the input data space and a workflow configuration (e.g., represented by a DG of transformation blocks) of the classification experiment. The classification platform system can schedule a first part (e.g., a first set of transformation blocks) of the workflow configuration to execute on a first computation platform and a second part (e.g., a second set of transformation blocks) of the workflow configuration to execute on a second computation platform. In some embodiments, the first part and the second part are mutually exclusive.

In some embodiments, scheduling the execution of the classification experiment includes imperatively programming computing nodes of the distributed computation platform to execute the transformation blocks based on the DG. This type of programming occurs when at least one of the transformation blocks in the DG can dynamically modify the DG during execution. Imperative programming is a programming paradigm that uses statements that change a program workflow's state. Imperative programming can focus on describing how a program workflow operates. The term can be used in contrast to declarative programming, which focuses on what the program workflow should accomplish without specifying how the program workflow should achieve the result.

In some embodiments, scheduling the execution of the classification experiment includes declaratively programming computing nodes of the distributed computation platform to execute the transformation blocks based on the DG. This type of programming occurs when the transformation blocks represent static functional blocks, where the transformation blocks in the DG does not explicitly manage the control flow of the distributed computation platform.

In block 706, the classification platform system can prevent a transformation block in the DG from being executed by the distributed computation platform if the transformation block as defined by the workflow configuration matches an entry in a memoization database (e.g., the memoization database 330 of FIG. 3). The entry can include pre-computed output result of the transformation block given the same or substantially same input and configuration. The memoization database reduces wasted computation resources when a developer is rerunning a classification experiment multiple times with modifications and changes to a subset of its experiment workflow. The memoization database enables the classification platform system to avoid having to re-execute a transformation block that is not modified. The memoization database also reduces wasted computation resources when multiple developers are running related classification experiments sharing one or more transformation blocks.

In block 708, the classification platform system can pipe an output result of executing the classification experiment to an application service. For example, the classification platform system can pipe the output result to a social networking system (e.g., the social networking system 200 of FIG. 2) to re-configure at least an application service of the social network system. In some embodiments, the classification experiment includes a comparison of multiple DGs representing data classification workflows.

In some embodiments, the output result of a classification experiment is stored in a database (e.g., a workflow database). For example, a classification experiment can include a main DG with multiple child DGs representing data classification workflows. The main DG can include a transformation block to evaluate the child DGs (e.g., by computing classification recall and classification precision of the data classification workflows). The main DG can include a transformation block to compare the evaluative measures. In these embodiments, the result of the classification experiment includes a data classification workflow selected as the "best" according to the evaluative measures. At the conclusion of the classification experiment, the data classification workflow can be marked in a workflow repository as having the best performance.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 8:
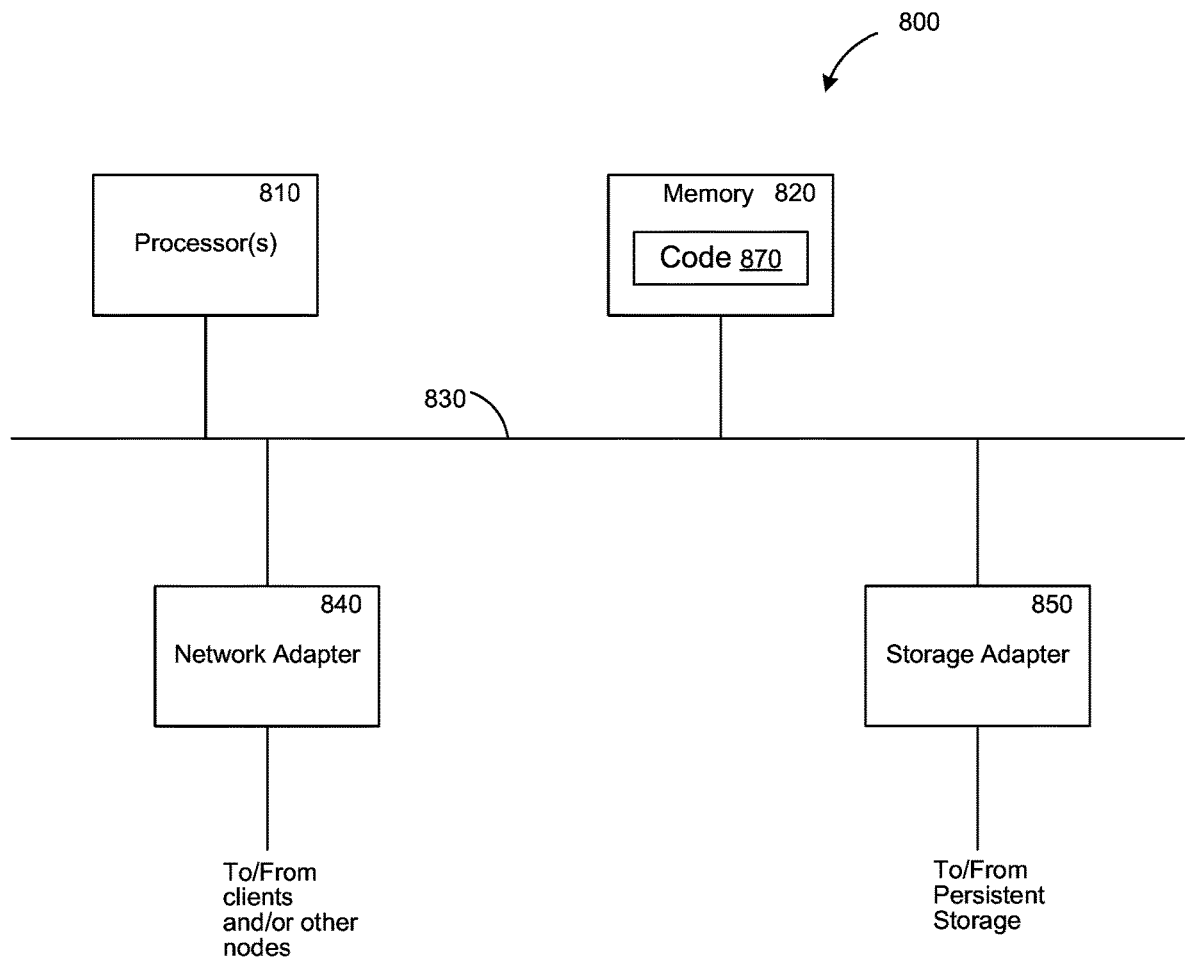
FIG. 8 is a block diagram of an example of a computing device, which may represent one or more computing device or server described herein, in accordance with various embodiments.

FIG. 8 is a block diagram of an example of a computing device 800, which may represent one or more computing device or server described herein, in accordance with various embodiments. The computing device 800 can be one or more computing devices that implement the social networking system 200 of FIG. 2 and/or the classification platform system 300 of FIG. 3. The computing device 800 can execute at least part of the method 600 of FIG. 6 or the method 700 of FIG. 7. The computing device 800 includes one or more processors 810 and memory 820 coupled to an interconnect 830. The interconnect 830 is an abstraction that represents any one or more separate physical buses, point-to-point connections, or both connected by appropriate bridges, adapters, or controllers. The interconnect 830, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 810 is/are the central processing unit (CPU) of the computing device 800 and thus controls the overall operation of the computing device 800. In certain embodiments, the processor(s) 810 accomplishes this by executing software or firmware stored in memory 820. The processor(s) 810 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 820 is or includes the main memory of the computing device 800. The memory 820 represents any form of random access memory (RAM), read-only memory (ROM), flash memory, or the like, or a combination of such devices. In use, the memory 820 may contain a code 870 containing instructions.

Also connected to the processor(s) 810 through the interconnect 830 are a network adapter 840 and a storage adapter 850. The network adapter 840 provides the computing device 800 with the ability to communicate with remote devices, over a network and may be, for example, an Ethernet adapter or Fibre Channel adapter. The network adapter 840 may also provide the computing device 800 with the ability to communicate with other computers. The storage adapter 850 enables the computing device 800 to access a persistent storage, and may be, for example, a Fibre Channel adapter or SCSI adapter.

The code 870 stored in memory 820 may be implemented as software and/or firmware to program the processor(s) 810 to carry out actions described above. In certain embodiments, such software or firmware may be initially provided to the computing device 800 by downloading it from a remote system through the computing device 800 (e.g., via network adapter 840).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; and/or optical storage media; flash memory devices), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. Reference in this specification to where a result of an action is "based on" another element or feature means that the result produced by the action can change depending at least on the nature of the other element or feature.

What is claimed is:

1. A computer-implemented method, comprising:
defining a classification experiment for executing tasks on a computation platform by at least:
  defining an input data space by selecting at least one of data sources interfaced with a classification platform system; and
  defining, via a definition user interface of the classification platform system, a workflow configuration of the classification experiment by defining a directed graph (DG) connecting a plurality of transformation blocks to represent an experiment workflow, wherein the DG specifies one or more connections from one or more outputs of each transformation block in the experiment workflow to one or more other transformation blocks;
formatting the workflow configuration and the input data space into a data structure such that the data structure is interpretable by a plurality of different computation platforms to execute the classification experiment, wherein the plurality of different computation platforms have a plurality of different hardware configurations of system components, respectively;
selecting, from the plurality of different computation platforms, a distributed computation platform to execute at least part of the experiment workflow in accordance with the DG;
generating, based on a hardware configuration of system components associated with the distributed computation platform, an execution schedule that specifies which system component executes each part of the classification experiment; and
scheduling the distributed computation platform to execute the classification experiment by the system components under the execution schedule according to the input data space and the workflow configuration, wherein the system components are scheduled to execute their respective parts of the classification experiment as specified by the execution schedule.

2. The computer-implemented method of claim 1, wherein the DG is arranged graphically via the definition user interface and wherein the definition user interface is a graphical user interface.

3. The computer-implemented method of claim 1, wherein said scheduling includes scheduling a first part of the workflow configuration to execute on a first computation platform and a second part of the workflow configuration to execute on a second computation platform.

4. The computer-implemented method of claim 1, wherein the distributed computation platform is selected based on a geographical or network location of the distributed computation platform relative to one or more geographical or network locations of input data specified in the input data space.

5. The computer-implemented method of claim 1, further comprising maintaining a memorization database; wherein said scheduling includes preventing a transformation block from being executed by the distributed computation platform when the transformation block as defined by the workflow configuration matches an entry in the memorization database; and wherein the entry includes pre-computed output result of the transformation block given the same input and configuration.

6. The computer-implemented method of claim 1, wherein the data sources include a live data source from a social networking system, and wherein the live data source produces an open-ended stream of new data entries formatted according to one or more data formats of the defined input data space.

7. The computer-implemented method of claim 1, wherein the data sources include a static data source from a social networking system, and wherein the static data source includes a static data set with a constant data size formatted according to one or more data formats of the defined input data space.

8. The computer-implemented method of claim 1, wherein the DG is acyclical and thereby prevents execution of the classification experiment to enter an infinite loop.

9. The computer-implemented method of claim 1, wherein a transformation block in the DG includes logic to dynamically modify the DG during execution of the experiment workflow.

10. The computer-implemented method of claim 9, wherein the transformation block includes logic to dynamically modify input data of an existing transformation block in the DG.

11. The computer-implemented method of claim 9, wherein the transformation block includes logic to change or remove an existing transformation block in the DG or to add a new transformation block to the DG.

12. The computer-implemented method of claim 1, further comprising piping an output result of executing the classification experiment to a social networking system to re-configure at least an application service of the social network system.

13. The computer-implemented method of claim 1, wherein the input data space is a labeled data space that includes at least a parameter to locate labeled data for training a supervised classifier machine learning model or for evaluating classification precision or recall of a classifier model, wherein said training or said evaluating is represented in a transformation block in the DG.

14. The computer-implemented method of claim 1, wherein the input data space is a prediction space that includes at least a parameter to locate input data to be classified in the classification experiment.

15. The computer-implemented method of claim 1, wherein defining the classification experiment further includes defining a domain configuration that includes at least a parameter binding the input data space to the workflow configuration.

16. The computer-implemented method of claim 1, wherein defining the classification experiment includes inheriting a directed graph for the workflow configuration from a workflow repository.

17. The computer-implemented method of claim 1, wherein the input data space selects at least a live data source from the data sources to feed into at least one of the transformation blocks; and wherein the distributed computation platform is configured to execute the classification experiment in substantially real-time in response to new data from the live data source.

18. The computer-implemented method of claim 1, wherein the transformation blocks include a data feature extraction process, data feature filtering process, a data feature transformation process, a classifier deliberation process, a classifier training process, a classifier evaluation process, or any combination thereof.

19. The method of claim 1, wherein formatting the workflow configuration is based on the DG.

20. A computer readable non-transitory data storage memory storing computer-executable instructions that, when executed by a computer system, cause the computer system to perform a computer-implemented method, the computer-executable instructions comprising:

instructions for defining a classification experiment for executing tasks on a computation platform by at least:

defining an input data space by selecting at least one of data sources interfaced with a classification platform system; and defining, via a definition user interface of the classification platform system, a workflow configuration of the classification experiment by defining a directed graph (DG) connecting a plurality of transformation blocks to represent an experiment workflow, wherein the DG specifies one or more connections from one or more outputs of each transformation block in the experiment workflow to one or more other transformation blocks;

instructions for formatting the workflow configuration and the input data space into a data structure such that the data structure is interpretable by a plurality of different computation platforms to execute the classification experiment, wherein the plurality of different computation platforms have a plurality of different hardware configurations of system components, respectively;

instructions for selecting, from the plurality of different computation platforms, a distributed computation platform to execute at least part of the experiment workflow in accordance with the DG;

instructions for generating, based on a hardware configuration of system components associated with the distributed computation platform, an execution schedule that specifies which system component executes each part of the classification experiment; and instructions for scheduling the distributed computation platform to execute the classification experiment by the system components under the execution schedule according to the input data space and the workflow configuration, wherein the system components are scheduled to execute their respective parts of the classification experiment as specified by the execution schedule.

21. A classification platform system, comprising:
a memory configured to store executable instructions; and
a processor configured by the executable instructions to implement an experiment management engine and a workflow execution engine;
wherein the experiment management engine is configured to defining a classification experiment for executing tasks on a computation platform by at least:

defining an input data space by selecting at least one of data sources interfaced with a classification platform system; and defining, via a definition user interface of the classification platform system, a workflow configuration of the classification experiment by defining a directed graph (DG) connecting a plurality of transformation blocks to represent an experiment workflow, wherein the DG specifies one or more connections from one or more outputs of each transformation block in the experiment workflow to one or more other transformation blocks;

wherein the workflow execution engine is configured to format the workflow configuration and the input data space into a data structure such that the data structure is interpretable by a plurality of different computation platforms to execute the classification experiment, wherein the plurality of different computation platforms have a plurality of different hardware configurations of system components, respectively;

wherein the workflow execution engine is configured to select, from the plurality of different computation platforms, a distributed computation platform to execute at least part of the experiment workflow in accordance with the DG;

wherein the workflow execution engine is configured to generate, based on a hardware configuration of system components associated with the distributed computation platform, an execution schedule that specifies which system component executes each part of the classification experiment; and wherein the workflow execution engine is configured to schedule the distributed computation platform to execute the classification experiment by the system components under the execution schedule according to the input data space and the workflow configuration, wherein the system components are scheduled to execute their respective parts of the classification experiment as specified by the execution schedule.

\* \* \* \* \*